UNITED STATES PATENT OFFICE 2,465,958

NITRO AMINES AND PROCESS FOR PREPARING THEM

Murray Senkus, Terre Haute, Ind., assignor to Commercial Solvents Corporation, Terre Haute, Ind., a corporation of Maryland No Drawing. Application March 14, 1947, Serial No. 734,859

10 Claims. (Cl. 260—345)

My invention relates to new nitro amines and to a process for the preparation thereof. Specifically, these new compounds may be represented by the following structural formula:

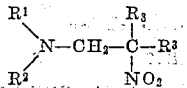

in which $R^1$ represents furfuryl or tetrahydrofurfuryl, $R^2$ represents hydrogen, alkyl, aralkyl or cycloalkyl and $R^3$ and $R^4$ represent alkyl groups.

As examples of nitro amines coming within the scope of the above formula there may be mentioned the following: N-(2-nitroisobutyl)-cyclohexylfurfurylamine, N-(2-nitroisobutyl)-isopropyltetrahydrofurfurylamine, N-(2-nitroisobutyl)-cyclohexyltetrahydrofurfurylamine, N-(2-nitroisobutyl)-isopropylfurfurylamine, N-(2-nitroisobutyl)-tetrahydrofurfurylamine, N-(2-nitroisobutyl)-furfurylamine, and N-(2-nitroisobutyl)-benzylfurfurylamine.

This application is a continuation-in-part of my co-pending application, Serial No. 579,895 filed February 26, 1945.

Prior investigators in this field have found that primary nitroparaffins would react with N-(hydroxymethyl) dialkylamines; however, they also arrived at the conclusion, while making the aforesaid discovery, that N-(hydroxymethyl) monoalkylamines would not react with primary nitroparaffins, and that secondary nitroparaffins would neither react with N-hydroxymethyl mono- nor dialkylamines under any of the experimental conditions which they had found to be effective in condensing a primary nitroparaffin with N-(hydroxymethyl) dialkylamines. Previous workers were of the opinion, in view of their own experimental results, that neither primary nor secondary nitroparaffins would react with condensation products derivable from formaldehyde and ammonia, formaldehyde and primary alkylamines, formaldehyde and aniline, formaldehyde and diphenylamine, formaldehyde and N-methylaniline, and numerous other products of similar structure prepared from higher molecular weight aldehydes, and primary or secondary amines.

Contrary to that which would normally be expected in view of the above prior art findings, however, I have discovered that nitro amines of the type described may be prepared by reacting formaldehyde with a primary or secondary amine in which one of the N substituents is a heterocyclic group attached to the amino nitrogen through a $CH_2$ group to form the corresponding N-(hydroxymethyl) mono-, or diamine, which is in turn reacted with an equimolecular amount of a secondary nitroparaffin to produce a nitro amine of the type represented by the generic formula given above.

A modification of the above procedure may frequently be employed to advantage, and consists of reacting the desired amine with a suitable nitro alcohol. A solvent may be used if desired, but in general it will be found that a homogeneous solution can be obtained by agitating the mixture of amine and nitro alcohol. The products, produced by this process, are identical with those synthesized by the first mentioned method; however, the mechanism of the reaction in its initial stages is materially different from that involved in the first procedure. In this connection, it has been observed that primary nitro alcohols, when in the presence of a substance appreciably basic in character, decompose into formaldehyde and the nitroparaffin from which they were derived, and in instances where the basic material happens to be a primary or secondary amine, the liberated formaldehyde reacts therewith to form a N-(hydroxymethyl) amine compound which then reacts with the nitroparaffin, produced by the decomposition of the nitro alcohol, in the same manner as described in the first procedure. The course of the reaction involved may be readily illustrated by the following series of equations:

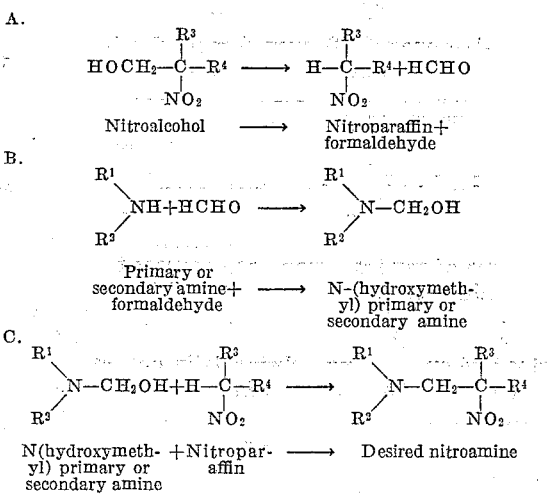

From an examination of the above series of equations, it will be evident that although the starting materials are different from those used in the process first described, both procedures may be considered equivalents of one another, since the compounds employed as starting materials in the first process are produced as intermediates in the second, after which said intermediates react in a manner identical with the mechanism involved in the reaction forming the basis of the first mentioned method. Therefore, it is to be specifically understood that the appended process claims include both methods.

The preparation of these nitro amines by either of the above-mentioned methods, is preferably effected at temperatures of from about 25°–30° C. Temperatures above this range may be used, but in doing so care should be exercised to avoid temperatures which cause the formaldehyde to be volatilized from the reaction mixture. In some cases it may be desirable to carry out the reaction in a high pressure reaction vessel. Under such circumstances, substantially higher temperatures may be utilized without loss of formaldehyde, and decomposition of the reactants, or the reaction products.

The amines which may be employed in preparing these new compositions of matter are represented by the formula:

$$\begin{array}{c} R^1 \\ \diagdown \\ NH \\ \diagup \\ R^2 \end{array}$$

wherein $R^1$ represents furfuryl or tetrahydrofurfuryl and $R^2$ represents hydrogen, alkyl, aralkyl or cycloalkyl.

As examples of such amines, there may be mentioned furfurylamine, tetrahydrofurfurylamine, cyclohexylfurfurylamine, cyclohexyltetrahydrofurfurylamine, isopropylfurfurylamine, isopropyltetrahydrofurfurylamine, and benzylfurfurylamine.

Nitroparaffins that are operative in my process may be represented by the following formula:

$$\begin{array}{c} R_3 \\ | \\ HC-R^4 \\ | \\ NO_2 \end{array}$$

wherein $R^3$ and $R^4$ represent alkyl groups.

Nitroparaffins typical of this class are 2-nitrobutane, 2-nitropropane, 2-nitropentane, and the like.

In reactions wherein nitro alcohols are employed instead of a nitroparaffin and formaldehyde, the following are examples of typical nitro alcohols which may be utilized: 2-nitro-2-methyl-1-propanol, 2-nitro-2-methyl-1-butanol, 2-nitro-2-ethyl-1-butanol, and the like.

The examples which follow are illustrative of the various types of nitro amines that come within the scope of the present invention. The examples are likewise illustrative of the procedures by which said products may be synthesized. It is to be specifically understood, however, that the following examples in no way limit the scope of my invention with respect to either the product or the process, since I have found that the reaction involved is very general in nature, and will occur, under the conditions described when reacting substantially any secondary nitroparaffin with a primary or secondary amine of the various types enumerated above.

Example I

A mixture which consisted of 180 g. (1 mole) of cyclohexylfurfurylamine, 120 g. (1.01 mole) of 2-nitro-2-methyl-1-propanol and 400 ml. of toluene was refluxed in a flask connected to a moisture trap which was connected to a condenser. After 15 ml. of water had separated in the trap the mixture was dissolved in 700 ml. of petroleum ether and the solution was washed with four 1000-ml. portions of water. The petroleum ether was removed by distillation at atmospheric pressure and the toluene at 40 mm. The distillation was then continued at 0.1 mm. This distillation yielded 18 g. of liquid, boiling range 25–109°, 10 g. liquid, boiling range 109–153° at 0.1 mm. and 195 g. of product which distilled at 153–155° at 0.1 mm. There was also 10 g. of residue.

The main cut (195 g.) is N-(2-nitroisobutyl)-cyclohexylfurfurylamine. Anal. calcd. for $C_{15}H_{24}N_2O_3$: N, 10.00. Found: N, 10.08.

$$d_{20}^{20} \; 1.0775, \; n_D^{20} \; 1.5010$$

Example II

A mixture which consisted of 143 g. (1 mole) of isopropyltetrahydrofurfurylamine, 120 g. (1.01 mole) of 2-nitro-2-methyl-1-propanol and 200 ml. of toluene was refluxed in a flask which was connected to a moisture trap and a condenser. After 18.5 ml. of water had separated in the trap, the mixture was dissolved in 500 ml. of petroleum ether and the solution was washed with three one-liter portions of water. The washed solution was distilled at atmospheric pressure to remove the petroleum ether and then at 76 mm. to remove the toluene. Further distillation yielded 14 g. of product, boiling range 26–104° at 0.1 mm. and 190 g. of product, B. P. 106–108° at 0.1 mm. There was 10 g. residue.

The main cut (190 g.) is N-(2-nitroisobutyl)-isopropyltetrahydrofurfurylamine.

Anal. calcd. for $C_{12}H_{24}N_2O_3$: N, 11.47. Found: N, 11.94.

 $n_D^{20} \; 1.4684, \; d_{20}^{20} \; 1.0327$

Example III

One mole of furfurylamine and one mole of 2-nitro-2-methyl-1-propanol were placed in a glass-stoppered reaction vessel and the mixture was shaken until it had become homogeneous. The mixture was allowed to stand at about 30° C. Water began to separate after about 10 hours. When the separation of water was substantially complete the crude product, N-(2-nitroisobutyl)-furfurylamine, was separated from the lower aqueous layer and was fractionated. Fractional distillation resulted in 87 parts of product corresponding to a conversion of 44%. The product had a nitrogen content of 14.24% as compared to a calculated value of 14.12%, a boiling point of 97–98° C. at 0.6 mm. and $$n_D^{20} \text{ of } 1.4850 \text{ and } d_{20}^{20} \text{ of } 1.1191$$

Example IV

One mole of tetrahydrofurfurylamine and one mole of 2-nitro-2-methyl-1-propanol were placed in a glass-stoppered reaction vessel and the mixture was shaken until it had become homogeneous. The mixture was allowed to stand at about 30° C. Water began to separate after about 10 hours. When the separation of water was substantially complete the crude product, N-(2-nitro-isobutyl) tetrahydrofurfurylamine, was separated from the lower aqueous layer and was fractionated. Fractional distillation resulted in 110 parts of product corresponding to a conversion of 55%. The product had a nitrogen content of 14.08% as compared to a calculated value of 13.85%, a boiling point of 101° C. at 0.5 mm. and $n_D^{20}$ of 1.4660 and $d_{25}^{25}$ of 1.0729

Example V

One mole (101 parts) of tetrahydrofurfurylamine was placed in a reaction vessel fitted with a stirrer, thermometer, and dropping funnel, then 75 parts of 35% aqueous formaldehyde were added to the amine during agitation. The mixture was externally cooled and the temperature maintained below 50° C., then 90 parts of 2-nitropropane were added to the reaction mixture and the mixture stirred for ½ hour while 500 parts of ethyl ether were added during stirring. Two layers separated and the non-aqueous layer was separated and distilled. Distillation resulted in 104 parts of N-(2-nitroisobutyl)tetrahydrofurfurylamine corresponding to a conversion of 75%. The product had a boiling point of 105° C. at 0.7 mm.

The nitro amines of my invention are in general either colorless liquids or white waxy solids. The low-molecular-weight nitro amines possess characteristic pungent odors, whereas the high-molecular-weight nitro amines are relatively odorless. The nitro amines are soluble in ether, methanol, and benzene, but are insoluble in water.

Some of the nitro amines of my invention have been found to be useful as toxicants in insect sprays. They are likewise useful as intermediates in the preparation of numerous organic compounds. Other uses of these products will readily occur to those skilled in the art.

Now having described my invention, what I claim is:

1. In the preparation of nitro amines of the formula

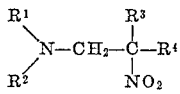

wherein R¹ represents a member selected from the group consisting of furfuryl and tetrahydrofurfuryl, R² is a member selected from the group consisting of hydrogen, alkyl, aralkyl or cycloalkyl and R³ and R⁴ represent alkyl groups, the process which comprises mixing and reacting formaldehyde and an amine having the formula

wherein R¹ represents a member selected from the group consisting of furfuryl or tetrahydrofurfuryl, R² is a member selected from the group consisting of hydrogen, alkyl, aralkyl or cycloalkyl, and a nitroalkane having the formula

wherein R³ and R⁴ represent alkyl groups, under conditions preventing any substantial loss of formaldehyde from the reaction mixture, and recovering the resulting nitroamine from the reaction mixture.

2. In the preparation of nitro amines of the formula

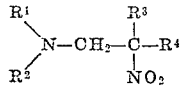

wherein R¹ represents a member selected from the group consisting of furfuryl and tetrahydrofurfuryl, R² is a member selected from the group consisting of hydrogen, alkyl, cycloalkyl and aralkyl, and R³ and R⁴ represent alkyl groups, the process which comprises mixing with formaldehyde at temperature above about 25° C., an amine having the formula

wherein R¹ represents a member selected from the group consisting of furfuryl, and tetrahydrofurfuryl and R² represents a member selected from the group consisting of hydrogen, alkyl, cycloalkyl and aralkyl, and a nitroalkane of the formula

wherein R³ and R⁴ represent alkyl groups, under conditions preventing any substantial loss of formaldehyde from the reaction mixture, and recovering the resulting nitroamine from the reaction mixture.

3. In the preparation of nitro amines of the formula

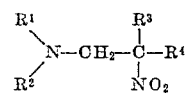

wherein R¹ represents a member selected from the group consisting of furfuryl and tetrahydrofurfuryl, R² is a member selected from the group consisting of hydrogen, alkyl, cycloalkyl and aralkyl, and R³ and R⁴ represent alkyl groups, the process which comprises mixing at temperatures above about 25° C. an amine having the formula

wherein R¹ represents a member selected from the group consisting of furfuryl and tetrahydrofurfuryl and R² represents a member selected from the group consisting of hydrogen, alkyl, cycloalkyl and aralkyl, and a nitro alcohol of the formula

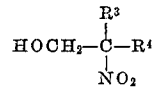

wherein R³ and R⁴ represent alkyl groups, under conditions preventing any substantial loss of formaldehyde from the reaction mixture, and recovering the resulting nitroamine from the reaction mixture.

4. In the preparation of N-(2-nitroisobutyl)-cyclohexylfurfurylamine, the process which comprises mixing and reacting cyclohexylfurfurylamine, formaldehyde, and 2-nitropropane, under conditions preventing any substantial loss of formaldehyde from the reaction mixture, and recovering the resulting N-(2-nitroisobutyl)-cyclohexylfurfurylamine from the reaction mixture.

5. In the preparation of N-(2-nitroisobutyl)-isopropyltetrahydrofurfurylamine, the process which comprises mixing and reacting isopropyltetrahydrofurfurylamine, formaldehyde, and 2-nitropropane, under conditions preventing any substantial loss of formaldehyde from the reaction mixture, and recovering the resulting N-(2- nitroisobutyl)-isopropyltetrahydrofurfurylamine from the reaction mixture.

6. In the preparation of N-(2-nitroisobutyl) furfurylamine, the process which comprises mixing and reacting furfurylamine, formaldehyde, and 2-nitropropane, under conditions preventing any substantial loss of formaldehyde from the reaction mixture, and recovering the resulting N-(2-nitroisobutyl)furfurylamine from the reaction mixture.

7. A composition of matter including nitro amines of the general type

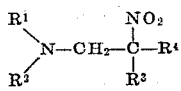

wherein $R^1$ represents a member selected from the group consisting of furfuryl and tetrahydrofurfuryl, $R^2$ is a member selected from the group consisting of hydrogen, alkyl, aralkyl and cycloalkyl and $R^3$ and $R^4$ represent alkyl groups.

8. N-(2-nitroisobutyl)cyclohexyfurfurylamine.
9. N-(2-nitroisobutyl)furfurylamine.
10. N-(2-nitroisobutyl)isopropyltetrahydrofurfurylamine.

MURRAY SENKUS.

REFERENCES CITED

The following references are of record in the file of this patent:

UNITED STATES PATENTS

| Number | Name | Date |
|---|---|---|
| 2,206,885 | Dickey et al. | July 9, 1940 |
| 2,253,082 | McNally et al. | Aug. 9, 1941 |
| 2,292,212 | Dickey et al. | Aug. 4, 1942 |

OTHER REFERENCES

Chemical Ab., 1938, page 494.

Patent No. 2,465,958

Certificate of Correction

March 29, 1949

MURRAY SENKUS

It is hereby certified that errors appear in the printed specification of the above numbered patent requiring correction as follows:

Column 1, lines 5 to 8, for that portion of the formula reading 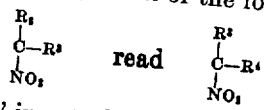 line 38, before the word "were" insert *also*; and that the said Letters Patent should be read with these corrections therein that the same may conform to the record of the case in the Patent Office.

Signed and sealed this 20th day of December, A. D. 1949.

[SEAL]

THOMAS F. MURPHY,
*Assistant Commissioner of Patents.*